US010516363B2

(12) United States Patent
Inokuma et al.

(10) Patent No.: US 10,516,363 B2
(45) Date of Patent: Dec. 24, 2019

(54) APPARATUS FOR CONTROLLING MOTOR

(71) Applicant: DENSO CORPORATION, Kariya, Aichi-pref. (JP)

(72) Inventors: Kenji Inokuma, Kariya (JP); Takashi Satou, Kariya (JP); Toyoji Yagi, Kariya (JP); Tomoyuki Shinkai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/477,503

(22) Filed: Apr. 3, 2017

(65) Prior Publication Data

US 2017/0294865 A1 Oct. 12, 2017

(30) Foreign Application Priority Data

Apr. 7, 2016 (JP) .................. 2016-077226

(51) Int. Cl.
| | |
|---|---|
| *H02P 29/60* | (2016.01) |
| *H02P 29/40* | (2016.01) |
| *H02P 29/62* | (2016.01) |
| *H02P 29/66* | (2016.01) |
| *H02P 6/12* | (2006.01) |
| *B60L 15/20* | (2006.01) |
| *B60L 50/61* | (2019.01) |

(52) U.S. Cl.
CPC .............. *H02P 29/60* (2016.02); *B60L 15/20* (2013.01); *B60L 50/61* (2019.02); *H02P 6/12* (2013.01); *H02P 29/40* (2016.02); *H02P 29/62* (2016.02); *H02P 29/66* (2016.02); *Y02T 10/6217* (2013.01); *Y02T 10/645* (2013.01); *Y02T 10/7005* (2013.01); *Y02T 10/7077* (2013.01); *Y02T 10/72* (2013.01); *Y02T 10/7275* (2013.01)

(58) Field of Classification Search
CPC .......... H02P 29/60; H02P 29/40; H02P 29/62; H02P 29/66; H02P 29/12
USPC ........................................... 318/473
See application file for complete search history.

(56) References Cited

U.S. PATENT DOCUMENTS

| | | | | |
|---|---|---|---|---|
| 4,468,603 A | * | 8/1984 | Vander Meer | H02P 23/26 318/729 |
| 4,636,702 A | * | 1/1987 | Hedges | H02H 7/0855 318/729 |
| 9,112,391 B2 | * | 8/2015 | Deguchi | H02K 9/19 |
| 2009/0284202 A1 | * | 11/2009 | Miura | G01K 7/42 318/473 |
| 2011/0095717 A1 | * | 4/2011 | Takizawa | B60L 1/06 318/473 |

(Continued)

FOREIGN PATENT DOCUMENTS

| | | |
|---|---|---|
| JP | S64-46538 A | 2/1989 |
| JP | 2003-339101 A | 11/2003 |

(Continued)

*Primary Examiner* — Jorge L Carrasquillo
*Assistant Examiner* — Devon A Joseph
(74) *Attorney, Agent, or Firm* — Oliff PLC

(57) ABSTRACT

An apparatus for controlling a motor having a housing in which a stator and a rotor are disposed. The motor is cooled by a cooling oil in the housing. The apparatus includes a control unit configured to control the motor. The control unit has a temperature increase mode for heating the cooling oil with use of heat generated by a resistance of a coil provided in the stator.

12 Claims, 12 Drawing Sheets

FIRST EMBODIMENT

(56) References Cited

U.S. PATENT DOCUMENTS

| | | | | |
|---|---|---|---|---|
| 2013/0026867 A1* | 1/2013 | Deguchi | ................. | H02K 9/19 310/53 |
| 2013/0345021 A1* | 12/2013 | Koizumi | ............... | B60W 10/06 477/98 |
| 2015/0008858 A1* | 1/2015 | Oh | ........................ | H02K 11/21 318/490 |
| 2015/0367734 A1* | 12/2015 | Mori | ........................ | B60L 3/12 701/22 |

FOREIGN PATENT DOCUMENTS

| JP | 2005-326054 A | 11/2005 |
|---|---|---|
| JP | 2007-267512 A | 10/2007 |
| JP | 2013-051786 A | 3/2013 |
| JP | 2013-085388 A | 5/2013 |
| JP | 2013-240230 A | 11/2013 |
| JP | 2014-075933 A | 4/2014 |

* cited by examiner

FIRST EMBODIMENT

FIRST EMBODIMENT

THIRD EMBODIMENT

FIFTH EMBODIMENT

FIG.15
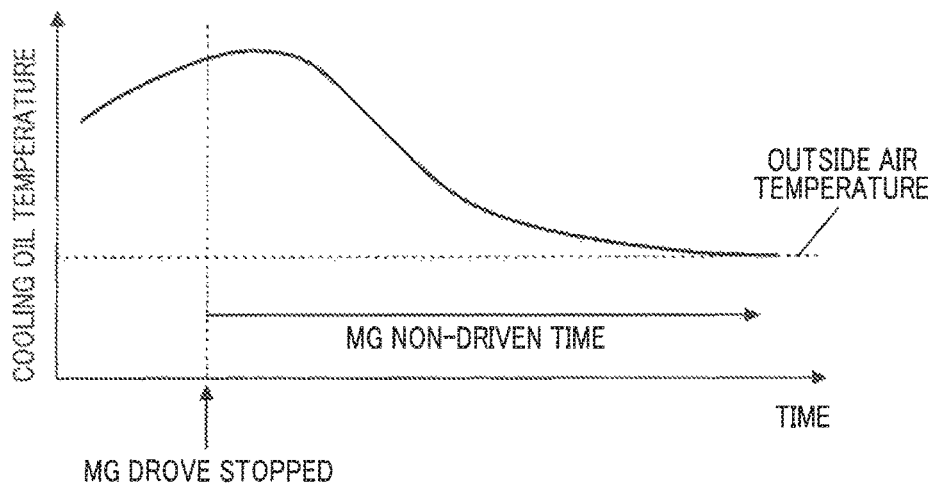
FIG.16    FIFTH EMBODIMENT
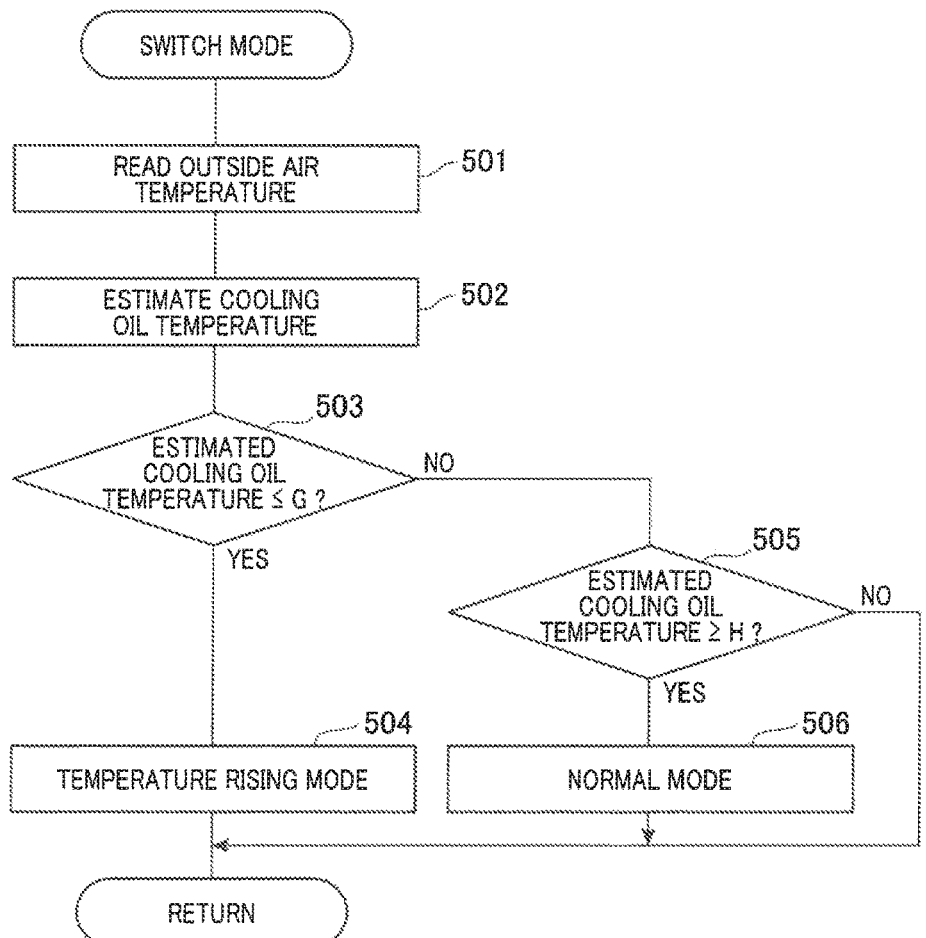

SIXTH EMBODIMENT

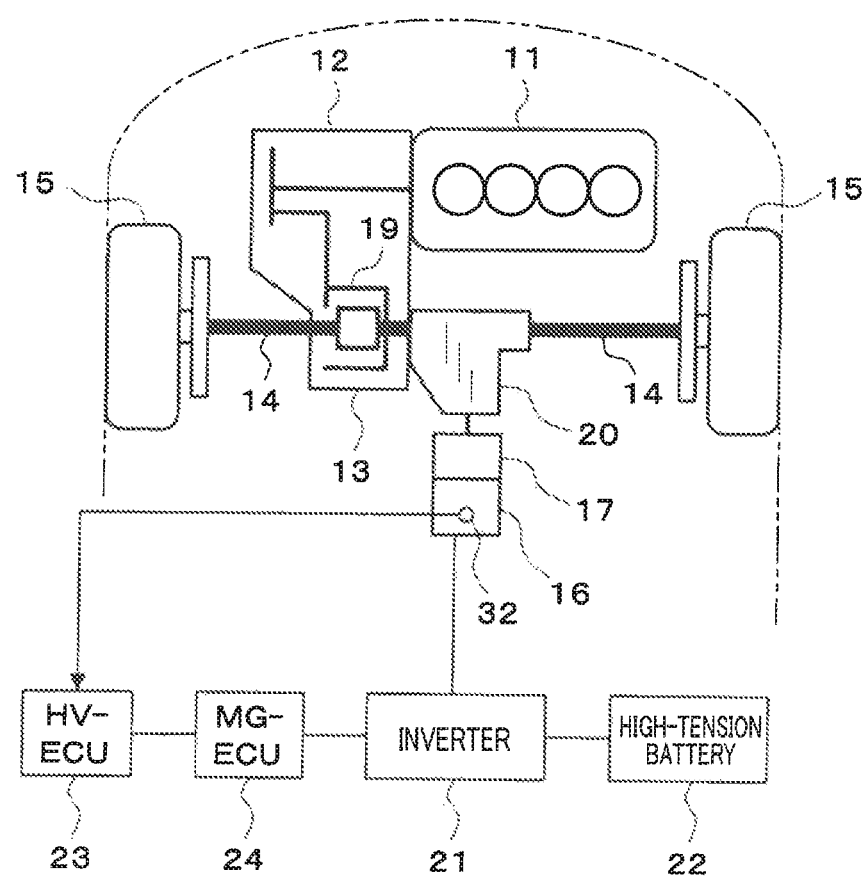

APPARATUS FOR CONTROLLING MOTOR

CROSS-REFERENCE TO RELATED APPLICATION

This application is based on and claims the benefit of priority from earlier Japanese Patent Application No. 2016-77226 filed Apr. 7, 2016, the descriptions of which are incorporated herein by reference.

BACKGROUND

Technical Field

The present invention relates to an apparatus for controlling a motor that is cooled by a cooling oil in a housing.

Related Art

A technique for preventing overheating of a motor is disclosed, for example, in JP-A-2013-85388. The technique of JP-A-2013-85388 is provided with an oil temperature sensor for detecting a temperature of a cooling oil in a motor housing, computes a winding temperature based on an oil temperature detected by this oil temperature sensor and a heat capacity and a heat resistance of the motor, and detects a motor temperature based on this winding temperature. When this detected motor temperature is a predetermined value or above, a torque of the motor is controlled.

In a motor cooled by a cooling oil in a housing such as the motor of JP-A-2013-85388, when a temperature of the cooling oil is low during a time of cooling or the like, viscosity of the cooling oil becomes high. Therefore, there is a problem that a rotation load of the rotor becomes large, and a drag loss due to the cooling oil (that is, a loss caused by the rotation load due to the cooling oil) becomes large.

In consideration of the foregoing, exemplary embodiments of the present invention are directed to providing an apparatus for controlling a motor, which can reduce a drag loss due to a cooling oil of the motor.

SUMMARY

In accordance with a first aspect of the present invention, there is provided an apparatus for controlling a motor having a housing in which a stator and a rotor are disposed. The motor is cooled by a cooling oil in the housing. The apparatus includes a control unit configured to control the motor, where the control unit has a temperature increase mode for heating the cooling oil with use of heat generated by a resistance of a coil provided in the stator.

The invention of this aspect is not limited to a configuration wherein a motor is cooled by a cooling oil sealed in a housing, but also includes a configuration wherein a motor is cooled by a cooling oil that is introduced into a housing from outside.

In this configuration, the motor is controlled in the temperature increase mode for heating the cooling oil with use of heat generated by the resistance of the coil, whereby the cooling oil can be actively heated. As a result, even when the temperature of the cooling oil is low and the viscosity of the cooling oil is high during a time of cooling or the like, the temperature of the cooling oil can be promptly raised, and the viscosity of the cooling oil can be promptly decreased (that is, a rotation load due to the cooling oil can be promptly decreased), and thus a drag loss due to the cooling oil of the motor can be reduced.

Preferably, the temperature increase mode is preferably a mode for controlling the motor with a current amplitude and a current phase that are different from those of a normal mode in which the motor is controlled with a current amplitude and a current phase with which a required torque of the motor is efficiently output. In this way, compared to the normal mode, electric power that does not contribute to torque generation is increased, and thus a heating value of the coil can be increased, and the temperature of the cooling oil can be raised while achieving the required torque. That is, the normal mode reduces power consumption, whereas the temperature increase mode increases power consumption more than that of the normal mode.

Preferably, an inverter for driving the motor and a battery for supplying electric power to the motor are preferably provided, and in the temperature increase mode, the control unit preferably has a function to configure the current phase of the motor to be retarded further than in the normal mode. In this way, compared to the normal mode, a negative d-axis current (that is, excitation current) is reduced, and protection from demagnetization of the permanent magnet (that is, prevention of irreversible demagnetization) becomes possible. In addition, temperatures of the inverter and the battery can be raised by loss increase of the inverter due to deterioration of power factor and power increase of the battery.

Preferably, in the aforementioned temperature increase mode, the aforementioned control unit may be configured so as to switch between a retard temperature increase mode in which the current phase of the aforementioned motor is configured to be retarded further than in the aforementioned normal mode and an advance temperature increase mode in which the current phase of the aforementioned motor is configured to be advanced further than in the aforementioned normal mode in accordance with at least one of the temperature of the aforementioned inverter and the current amplitude of the aforementioned motor. In this way, when temperature increase of the inverter and/or protection from demagnetization of the permanent magnet is unnecessary, the mode can be switched to the advance temperature increase mode. In this advance temperature increase mode, compared to the retard temperature increase mode, deterioration of power factor is suppressed, and thus an output of a battery can be reduced, and deterioration of battery can be suppressed.

Preferably, in the aforementioned temperature increase mode, when the required torque of the aforementioned motor is 0, the aforementioned control unit may configure the current phase of the aforementioned motor to be a phase with which a torque is not generated (for example, 0 degree or 180 degrees). In this way, even when the required torque of the motor is 0, the temperature of the cooling oil can be raised while achieving the required torque (that is, without generating a torque).

Preferably, a cooling oil temperature sensor for detecting the temperature of the aforementioned cooling oil may be provided, and the aforementioned control unit may be configured so as to switch the aforementioned normal mode to the aforementioned temperature increase mode when the temperature of the aforementioned cooling oil detected by the aforementioned cooling oil temperature sensor is a predetermined value A or below. In this way, the temperature of the cooling oil is directly detected by the cooling oil temperature sensor, and the temperature increase of the cooling oil is securely and accurately determined, and thus the mode can be switched to the temperature increase mode.

Preferably, the aforementioned control unit may be configured so as to switch the aforementioned temperature increase mode to the aforementioned normal mode when the temperature of the aforementioned cooling oil detected by the aforementioned cooling oil temperature sensor is a predetermined value B or above that is higher than the predetermined value A. In this way, a hysteresis characteristic can be given to the switching based on the temperature of the cooling oil between the normal mode and the temperature increase mode (that is, a hysteresis is provided in the switching determination values of the normal mode and the temperature increase mode), and frequent mode switching can be prevented.

In addition, there is a correlation between the temperature of the coil and the temperature of the cooling oil, and therefore, preferably, a coil temperature sensor for detecting the temperature of the aforementioned coil may be provided, and the aforementioned control unit may be configured so as to switch the aforementioned normal mode to the aforementioned temperature increase mode when the temperature of the aforementioned coil detected by the aforementioned coil temperature sensor is a predetermined value C or below. In this way, even in a case where the cooling oil temperature sensor is not installed, necessity of the temperature increase of the cooling oil is accurately determined based on the temperature of the coil detected by the coil temperature sensor, and thus the mode can be switched to the temperature increase mode.

Preferably, the aforementioned control unit may be configured so as to switch the aforementioned temperature increase mode to the aforementioned normal mode when the temperature of the aforementioned coil detected by the aforementioned coil temperature sensor is a predetermined value D or above that is higher than the aforementioned predetermined value C. In this way, a hysteresis characteristic can be given to the switching based on the temperature of the coil between the normal mode and the temperature increase mode, and frequent mode switching can be prevented.

In addition, there is a correlation between the temperature of the coil and the temperature of the cooling oil, and therefore the temperature of the cooling oil can be estimated from the temperature of the coil. Accordingly, preferably, a coil temperature sensor for detecting the temperature of the aforementioned coil may be provided, and the aforementioned control unit may be configured so as to estimate the temperature of the aforementioned cooling oil based on the temperature of the aforementioned coil detected by the aforementioned coil temperature sensor, and to switch the aforementioned normal mode to the aforementioned temperature increase mode when the estimated cooling oil temperature that is the estimated value is a predetermined value E or below. In this way, even in a case where the cooling oil temperature sensor is not installed, necessity of the temperature increase of the cooling oil is accurately determined based on the estimated cooling oil temperature estimated from the temperature of the coil, and thus the mode can be switched to the temperature increase mode.

Preferably, the aforementioned control unit may be configured so as to switch the aforementioned temperature increase mode to the aforementioned normal mode when the aforementioned estimated cooling oil temperature is a predetermined value F or above that is higher than the aforementioned predetermined value E. In this way, a hysteresis characteristic can be given to the switching based on the estimated cooling oil temperature between the normal mode and the temperature increase mode, and frequent mode switching can be prevented.

In addition, there is a correlation between an outside air temperature, a motor non-driven time (that is, an elapsed time from a time at which the motor becomes in a non-driven state) and the temperature of the cooling oil, and therefore, the temperature of the cooling oil can be estimated from the outside air temperature and the motor non-driven time. Accordingly, preferably, an outside air temperature sensor for detecting an outside air temperature may be provided, and the aforementioned control unit may be configured so as to estimate the temperature of the aforementioned cooling oil based on the aforementioned outside air temperature detected by the aforementioned outside air temperature sensor and an elapsed time from a time at which the aforementioned motor becomes in a non-driven state, and to switch the aforementioned normal mode to the aforementioned temperature increase mode when the estimated cooling oil temperature that is the estimated value is a predetermined value G or below. In this way, even in a case where the cooling oil temperature sensor is not installed, necessity of the temperature increase of the cooling oil is accurately determined based on the estimated cooling oil temperature estimated from the outside air temperature and the motor non-driven time, and thus the mode can be switched to the temperature increase mode.

Preferably, an inverter for driving the aforementioned motor, a battery for supplying electric power to the aforementioned motor and a buck-boost converter connected between the aforementioned battery and the aforementioned inverter may be provided, and the aforementioned control unit may be configured so as to control switching between the aforementioned normal mode and the aforementioned temperature increase mode based on an output voltage of the aforementioned buck-boost converter. In this way, in order to switch to the temperature increase mode, the output voltage of the buck-boost converter is configured so as to be low to perform a field-weakening control, whereby the current phase of the motor can be changed further to the advance side than that of the normal mode.

Preferably, the aforementioned cooling oil is preferably sealed in an enclosed space in the aforementioned housing, and stored up to a height position that is higher than the lowest part of the aforementioned rotor and lower than the rotating shaft of the aforementioned rotor. In an oil-tight configuration wherein the cooling oil is sealed in the enclosed space in the housing, when the cooling oil has a low temperature, a drag loss due to the cooling oil tends to be large; however, by applying the present invention, the drag loss due to the cooling oil can be effectively reduced. In addition, by storing the cooling oil up to the height position that is higher than the lowest part of the rotor, internal heat of the motor is efficiently transmitted to the housing via the cooling oil and thus can be released to the outside of the motor, and the motor can be effectively cooled down. Furthermore, by storing the cooling oil up to the height position that is lower than the rotating shaft of the rotor, an amount of the cooling oil to be sealed is suppressed appropriately, and thus a rotation load of the motor due to the cooling oil can be suppressed appropriately.

The present invention is preferably applied to a motor that is mounted as a power source of a vehicle. In this way, by reducing a drag loss due to the cooling oil of the motor, an adverse influence on vehicle performance (for example, deterioration of fuel efficiency) can be suppressed.

BRIEF DESCRIPTION OF THE DRAWINGS

FIG. 15 is a diagram showing a relationship between an outside air temperature, an MG non-driven time and a cooling oil temperature;

FIG. 16 is a flow chart showing a process flow of a mode switching routine of the fifth embodiment;

FIG. 18 is a diagram showing a schematic configuration of a control system of a hybrid vehicle of a seventh embodiment.

DESCRIPTION OF SPECIFIC EMBODIMENTS

Figure 1:
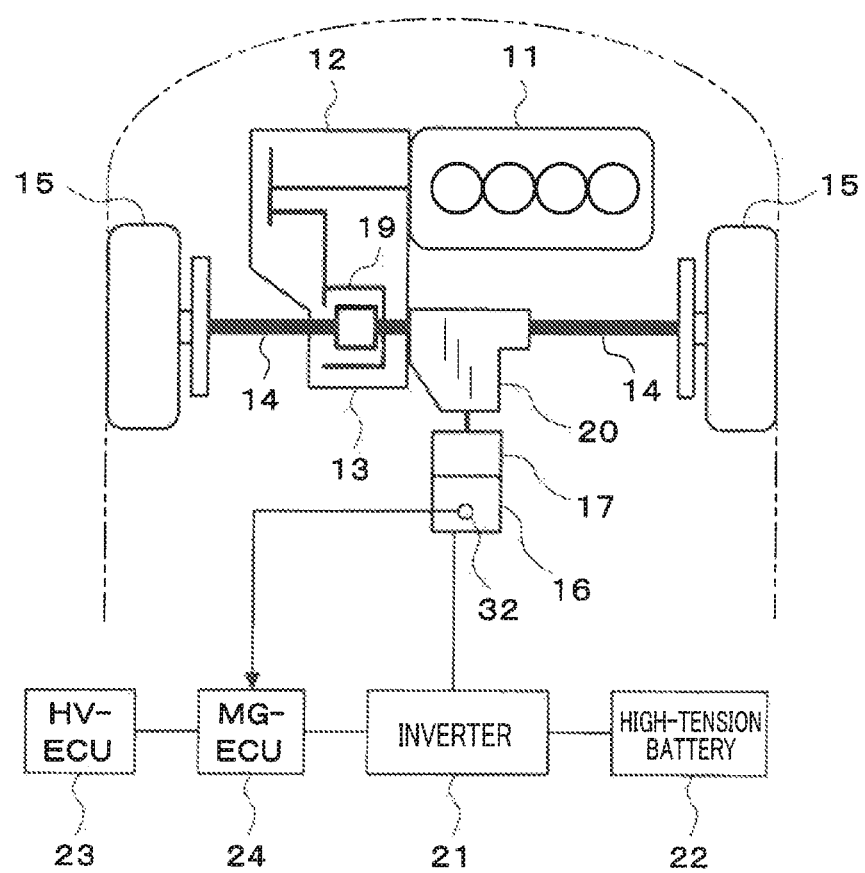
FIG. 1 is a diagram showing a schematic configuration of a control system of hybrid vehicle in a first embodiment of the present invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

First Embodiment

A first embodiment of the present invention will be described with reference to FIGS. 1 to 5.

Firstly, with reference to FIG. 1, a schematic configuration of a control system of a hybrid vehicle will be described.

An engine 11 that is a power source of a vehicle and a transmission 12 connected to this engine 11 are mounted on a front part of the vehicle. The transmission 12 is a mechanical transmission, and may be a multistage transmission that switches in stages a transmission stage between a plurality of transmission stages, or may be a continuously variable transmission (so-called CVT) that continuously shifts speed. This engine 11 and transmission 12 are transversely arranged in such a manner that an axial direction of an output shaft (that is, crankshaft) of the engine 11 becomes a right and left direction of the vehicle. Power of the output shaft of the engine 11 is transmitted to the transmission 12, and power of an output shaft of this transmission 12 is transmitted to a drive shaft 14 of a wheel 15 via a differential gear mechanism 13 or the like.

Furthermore, a small-diameter motor generator (hereinafter, referred to as "MG") 16 that is a power source of the vehicle and a small-diameter reduction gear 17 connected to this MG 16 are mounted at the rear of the engine 11 and the transmission 12. The MG 16 and the reduction gear 17 are vertically arranged in such a manner that an axial direction of an output shaft becomes an anteroposterior direction of the vehicle. An output shaft of the reduction gear 17 is connected to a link gear 19 of a differential gear mechanism 13 (that is, a gear to which the power of the output shaft of the transmission 12 is input) via a transfer 20. In this way, power of an output shaft of MG 16 is transmitted to the reduction gear 17, and the power of the output shaft of this reduction gear 17 is transmitted to the drive shaft 14 of the wheel 15 via the transfer 20, the differential gear mechanism 13 or the like.

In addition, an inverter 21 for driving the MG 16 is connected to a high-tension battery 22, and electric power is transferred between the MG 16 and a high-tension battery 22 via an inverter 21. The high-tension battery 22 is a DC power supply, which comprises rechargeable battery or the like. The inverter 21 converts a direct-current voltage of the high-tension battery 22 to an alternating-current voltage to drive the MG 16.

An HV-ECU 23 is a controller for comprehensively controlling the whole vehicle, and reads output signals of various types of sensors and switches (for example, accelerator sensor, shift switch, brake switch, vehicle speed sensor, etc.), and detects an operational status of the vehicle. This HV-ECU 23 transmits/receives a control signal or a data signal between an MG-ECU 24 and an engine ECU (not shown). The MG-ECU 24 is a control device for controlling an inverter 21 to control the MG 16, and the engine ECU is a control device for controlling operation of the engine 11.

The HV-ECU 23 controls the engine 11, MG 16 or the like by each ECU in accordance with an operational status of the vehicle. In doing so, the HV-ECU 23 switches a traveling mode between, for example, an engine traveling mode, an assist traveling mode and an EV traveling mode. In the engine traveling mode, engine traveling wherein the wheel 15 is driven to make a vehicle travel only by power of the engine 11 within the engine 11 and MG 16 is performed. In the assist traveling mode, assist traveling wherein the wheel 15 is driven to make the vehicle travel by both of the power of the engine 11 and power of the MG 16 is performed. In the EV traveling mode, EV traveling wherein the wheel 15 is driven to make a vehicle travel only by power of the MG 16 within the engine 11 and MG 16 is performed.

In addition, when braking the vehicle (for example, when generating braking power when the accelerator is released or the brake is depressed), the HV-ECU 23 switches the traveling mode to a regenerative power generation mode. In this regenerative power generation mode, the power of the wheel 15 drives the MG 16, thereby performing regenerative power generation for converting kinetic energy of the vehicle to electric energy by the MG 16, and the regenerative electric power that is the generated power is charged to the high-tension battery 22.

Figure 2:
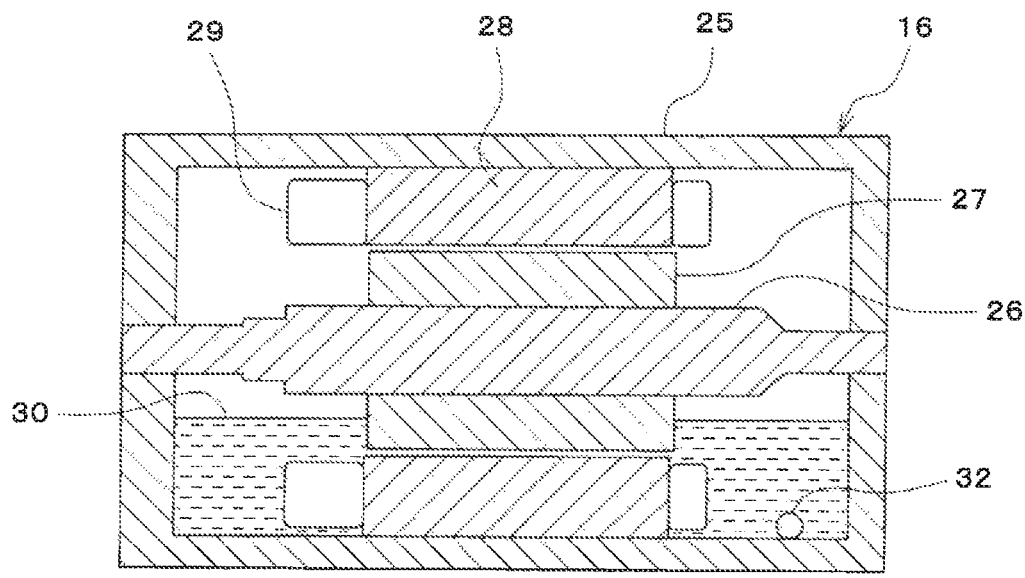
FIG. 2 is a longitudinal sectional diagram showing a schematic configuration of an MG.

Next, a schematic configuration of MG 16 will be described with reference to FIG. 2.

In a housing 25 of the MG 16, a rotor 27 that integrally rotates with a rotating shaft 26 and a stator 28 that is arranged in a periphery side of this rotor 27 are provided. A coil 29 comprising a plurality of phase windings is wound around the stator 28.

In addition, a cooling oil 30 for cooling the MG 16 is sealed in an enclosed space in the housing 25. This cooling oil 30 is stored up to a lowest part of the rotor 27 in a rotation stopped state of the MG 16, that is, a height position higher than a part closest to the ground within a rotor outer peripheral surface and lower than the rotating shaft 26 of the rotor 27. When the MG 16 rotates, the cooling oil 30 is scooped up by rotation of the rotor 27, and is spread in the housing 25. The cooling oil 30 is a fluid having an insulating characteristic, and may be a lubricant for vehicles such as an automatic transmission fluid for automatic transmission (so-called ATF).

Furthermore, in the housing 25 of the MG 16, a cooling oil temperature sensor 32 for detecting a temperature of the cooling oil 30 is provided. This cooling oil temperature sensor 32 is installed at a position immersed in the cooling oil 30 and separated from the coil 29 (that is, a position that does not come in contact with the coil 29). As illustrated in FIG. 1, an output signal of the cooling oil temperature sensor 32 is inputted to the MG-ECU 24.

Figure 3:
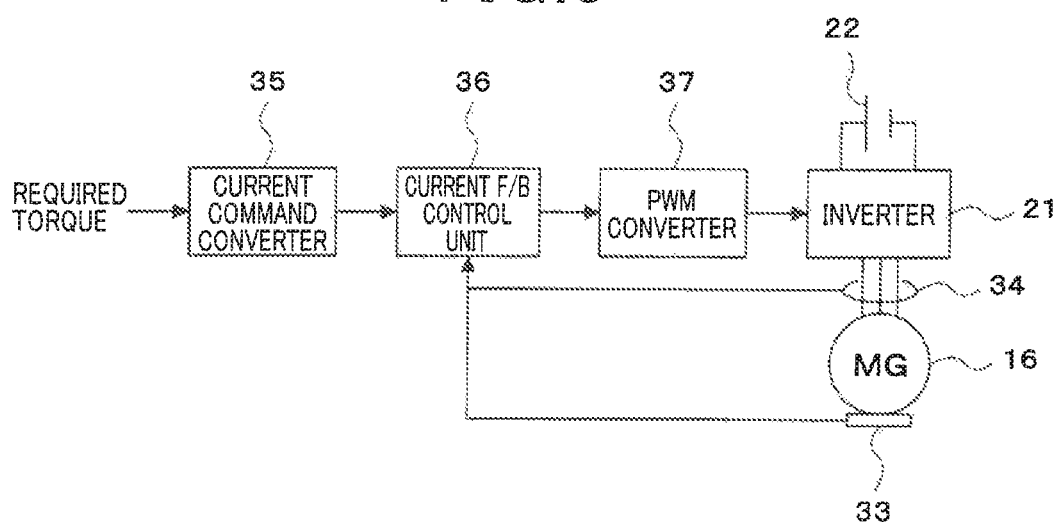
FIG. 3 is a block diagram illustrating torque control of the MG.

Next, torque control of the MG 16 will be described with reference to FIG. 3.

MG 16 is, for example, a three-phase permanent magnet type synchronous motor wherein a permanent magnet is embedded, and a rotational position sensor 33 for detecting a rotational position θ of the rotor 27 (that is, rotation angle) is mounted. The Inverter 21 converts, based on three-phase 6 arm voltage command signal UU, UL, VU, VL, WU, WL output from the MG-ECU 24, the direct-current voltage of the high-tension battery 22 to a three-phase alternating-current voltage U, V, W so as to drive the MG 16. A U-phase current iu flowing in a U-phase and a W-phase current iw flowing in a W-phase of the MG 16 is detected by a current sensor 34.

The MG-ECU 24 controls the inverter 21 in such a manner that an output torque of the MG 16 becomes a required torque (that is, torque command value) to execute a torque control for adjusting an alternating-current voltage to be applied to the MG 16. In this torque control, a current F/B control for performing feedback control of energization of the MG 16 to reduce a deviation between a current command value based on the required torque output from the HV-ECU 23 and a current detected value based on an output of the current sensor 34 is performed in the following manner. In doing so, in a d-q coordinate system that is a rotating coordinate system that has been set as a rotor rotating coordinate of the MG 16, feedback control of each of a d-axis current id and a q-axis current iq is performed independently.

The MG-ECU 24 first computes a command current vector (d-axis current command value Id, q-axis current command value Iq) based on the required torque and a rotational speed of the MG 16 by a map, a mathematical formula or the like, in a current command converter 35.

After this, a current F/B control unit 36 computes a detected current vector (d-axis current detected value id, q-axis current detected value iq) that is a detected value of current flowing through the MG 16 based on an U-phase current iu and an W-phase current iw of the MG 16 detected by the current sensor 34 and a rotor rotational position θ of the MG 16 detected by the rotational position sensor 33. Furthermore, a d-axis voltage command value Vd is computed by PI control or the like in such a manner that a deviation Δid between the d-axis current command value Id and the d-axis current detected value id becomes small, and at the same time, a q-axis voltage command value Vq is computed by PI control or the like in such a manner that deviation Δiq between a q-axis current command value Iq and a q-axis current detected value iq, and thus a command voltage vector (d-axis voltage command value Vd, q-axis voltage command value Vq) is obtained.

After this, a PWM converter 37 computes three-phase voltage command values Vu, Vv, Vw by three-phase modulation or two-phase modulation based on the command voltage vector (d-axis voltage command value Vd, q-axis voltage command value Vq) and the rotor rotational position θ of the MG 16, and these three-phase voltage command values Vu, Vv, Vw are converted to three-phase 6 arm voltage command signals UU, UL, VU, VL, WU, WL by a sine wave PWM control system. These three-phase 6 arm voltage command signals UU, UL, VU, VL, WU, WL are output to the inverter 21.

In the meantime, in the MG 16 cooled by the cooling oil 30 in the housing 25, if the temperature of the cooling oil 30 is low during a time of cooling or the like, the viscosity of the cooling oil 30 becomes high. For this reason, a rotation load of the rotor 27 becomes large, and thus there is a problem that a drag loss due to the cooling oil 30 (that is, a loss caused by a rotation load due to the cooling oil 30) becomes large.

Accordingly, in this first embodiment, the MG-ECU 24 executes a mode switching routine of later-mentioned FIG. 5, whereby a normal mode and a temperature increase mode are switched as follows. When the temperature of the cooling oil 30 detected by the cooling oil temperature sensor 32 is a predetermined value or below, the normal mode is switched to the temperature increase mode, and when the temperature of the cooling oil 30 detected by the cooling oil temperature sensor 32 is higher than a predetermined value, the temperature increase mode is switched to the normal mode.

Figure 4:
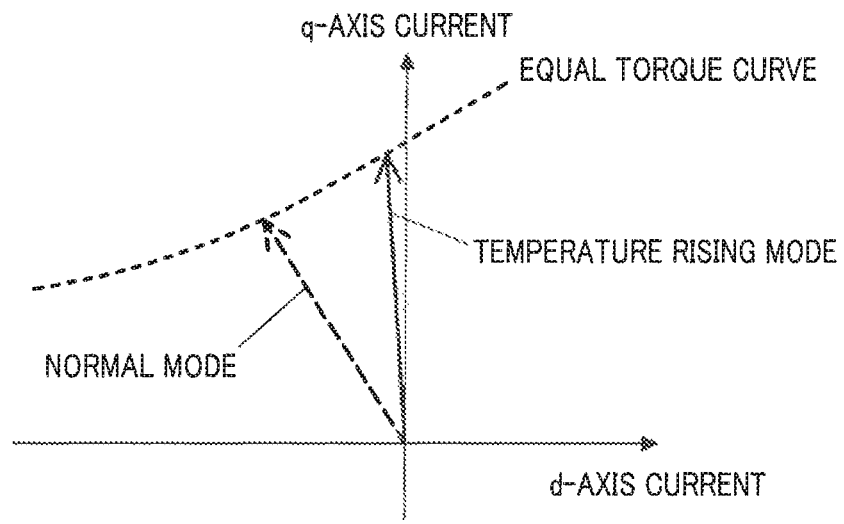
FIG. 4 is a diagram illustrating a normal mode and a temperature increase mode.

The normal mode is a mode for controlling the MG 16 with a current amplitude and a current phase with which the required torque of the MG 16 is most efficiently output. As illustrated in FIG. 4, in the normal mode, a command current vector (d-axis current command value Id, q-axis current command value Iq) is set at an operating point where the current amplitude and the current phase with which the required torque is most efficiently output in an equal torque curve that outputs the required torque of the MG 16 and current F/B control of the MG 16 is performed. In this way, electric power can be reduced.

The temperature increase mode is a mode wherein the cooling oil 30 is heated with use of heat generated by the resistance of the coil 29 and the MG 16 is controlled with the current amplitude and the current phase that are different from that of the normal mode. In this first embodiment, as illustrated in FIG. 4, in the temperature increase mode, a command current vector (d-axis current command value Id, q-axis current command value Iq) is set in such a manner that the current phase of the MG 16 is retarded further than in the normal mode in the equal torque curve for outputting the required torque of the MG 16, that is, the current F/B control of the MG 16 is performed at an operating point where electric power is greater than that of a case of control at the operating point in the normal mode. In the first embodiment, the operating point of the temperature increase mode is a point on an equal torque curve, the point being retarded further (right side in the figure) than a point that is specified on the equal torque curve in the normal mode, and to what degree the point should be in the retard side may be selected as appropriate.

Hereinafter, the processing content of the mode switching routine of FIG. 5, which is executed by the MG-ECU 24 in this first embodiment, will be described.

Figure 5:
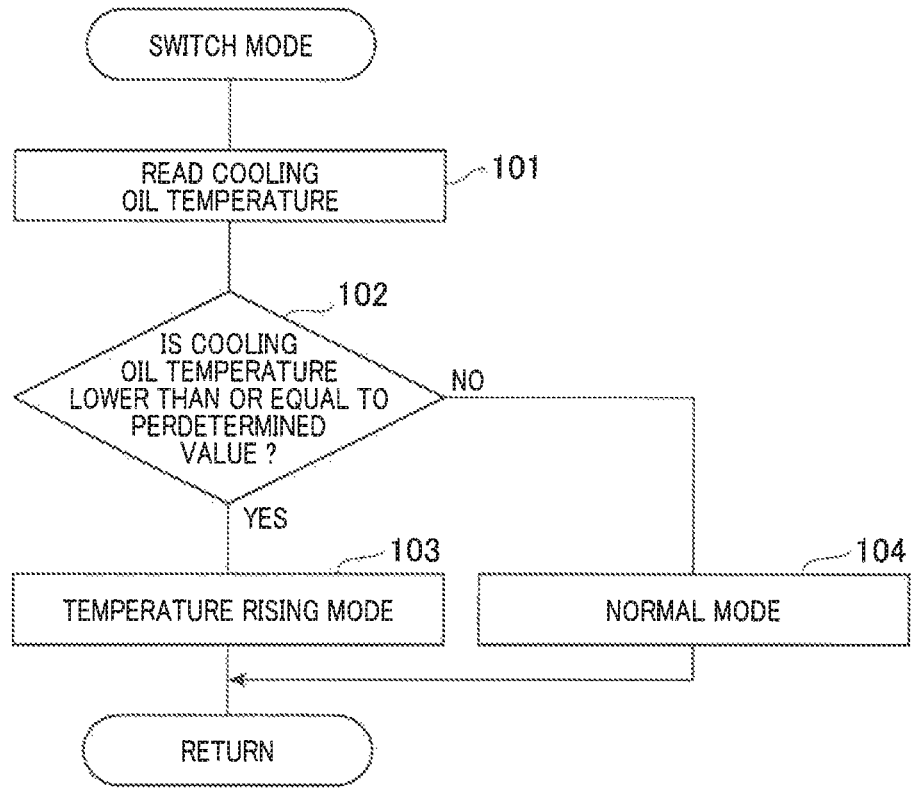
FIG. 5 is a flow chart showing the process flow of mode switching routine of the first embodiment.

The mode switching routine shown in FIG. 5 is repeatedly executed in a predetermined cycle during a power-on period of the MG-ECU 24, and plays a role as a control unit in the claims.

When this routine is activated, first, in step 101, the temperature of the cooling oil 30 detected by the cooling oil temperature sensor 32 is read.

After this, the routine proceeds to step 102, and determines whether or not the temperature of the cooling oil 30 detected by the cooling oil temperature sensor 32 is a predetermined value or below. Here, the predetermined value is set to be a temperature (for example, 0° C.) at which a drag loss due to the cooling oil 30 exceeds an acceptable level.

In this step 102, when determining that the temperature of the cooling oil 30 is a predetermined value or below, the routine proceeds to step 103, and switches a normal mode to a temperature increase mode (or maintains the temperature increase mode). In this temperature increase mode, a command current vector (d-axis current command value Id, q-axis current command value Iq) is set in such a manner that the current phase of the MG 16 is retarded further than in the normal mode in the equal torque curve for outputting the required torque of the MG 16, and the current F/B control of the MG 16 is performed. In addition, when the required torque of the MG 16 is 0 in the temperature increase mode, the mode may be a zero torque temperature increase mode that will be described in the later mentioned second embodiment.

Meanwhile, in the abovementioned step 102, when determining that the temperature of the cooling oil 30 is higher than a predetermined value, the routine proceeds to step 104, and switches from a temperature increase mode to a normal mode (or maintains the normal mode). In this normal mode, a command current vector (d-axis current command value Id, q-axis current command value Iq) is set in such a manner that the current amplitude and the current phase become such that the required torque is most efficiently output in the equal torque curve for outputting the required torque of the MG 16, and the current F/B control of the MG 16 is performed.

In this first embodiment stated above, when the temperature of the cooling oil 30 detected by the cooling oil temperature sensor 32 is a predetermined value or below, the MG 16 is controlled in the temperature increase mode for heating the cooling oil 30 with use of heat generated by the resistance of the coil 29, whereby the cooling oil 30 can be actively heated. For this reason, even when the temperature of the cooling oil 30 is low and the viscosity of the cooling oil 30 is high during a time of cooling or the like, the temperature of the cooling oil 30 can be promptly raised, and the viscosity of the cooling oil 30 can be promptly decreased (that is, a rotation load due to the cooling oil 30 can be promptly decreased), and thus a drag loss due to the cooling oil 30 of the MG 16 can be reduced.

In addition, in this first embodiment, the temperature increase mode is configured to so as be a mode wherein the MG 16 is controlled with a current amplitude and a current phase that are different from that of the normal mode wherein the MG 16 is controlled the current amplitude and the current phase with which the required torque of the MG 16 is most efficiently output. For this reason, compared to the normal mode, electric power that does not contribute to torque generation is increased, and a heating value of the coil 29 can be increased, and the temperature of the cooling oil 30 can be raised while achieving the required torque.

Furthermore, in this first embodiment, in the temperature increase mode, the current phase of the MG 16 is retarded further than in the normal mode. For this reason, compared to the normal mode, negative d-axis current (that is, excitation current) is reduced, and protection from demagnetization of the permanent magnet (that is, prevention of irreversible demagnetization) can be performed. In addition, temperatures of the inverter 21 and the high-tension battery 22 can be raised by loss increase of the inverter 21 due to deterioration of power factor and power increase of high-tension battery 22.

In addition, in this first embodiment, the cooling oil 30 is sealed in an enclosed space in the housing 25, and stored up to a height position that is higher than the lowest part of the rotor 27 and lower than the rotating shaft 26 of the rotor 27. In an oil-tight configuration wherein the cooling oil 30 is sealed in the enclosed space in the housing 25, when the cooling oil 30 has a low temperature, a drag loss due to the cooling oil 30 tends to be large; however, by controlling the MG 16 in the temperature increase mode, the drag loss due to the cooling oil 30 can be effectively reduced. In addition, by storing the cooling oil 30 up to the height position that is higher than the lowest part of the rotor 27, internal heat of the MG 16 is efficiently transmitted to the housing 25 via the cooling oil 30 and thus can be released to the outside of the MG 16, and the MG 16 can be effectively cooled down. Furthermore, by storing the cooling oil 30 up to the height position that is lower than the rotating shaft 26 of the rotor 27, an amount of the cooling oil 30 to be sealed is suppressed appropriately, and thus a rotation load of MG 16 due to the cooling oil 30 can be suppressed appropriately.

Furthermore, in this first embodiment, by reducing a drag loss due to the cooling oil 30 of the MG 16 that has been mounted as a power source of a vehicle, an adverse influence on vehicle performance (for example, deterioration of fuel efficiency) can be suppressed. As the adverse influence, in a case of a hybrid vehicle for example, in the EV traveling mode, if the drag loss due to the cooling oil 30 of the MG 16, the output torque of the MG 16 is decreased, and thus, a driver pushes the accelerator down more. Consequently, the engine 11 is unnecessarily started, and there are cases where fuel efficiency deteriorates.

Second Embodiment

Next, the second embodiment of the present invention will be described with use of FIG. 6 to FIG. 9. However, explanation of a part substantially same as or similar to the aforementioned first embodiment will be omitted or simplified, and a part different from the aforementioned first embodiment will be mainly described.

Figure 9:
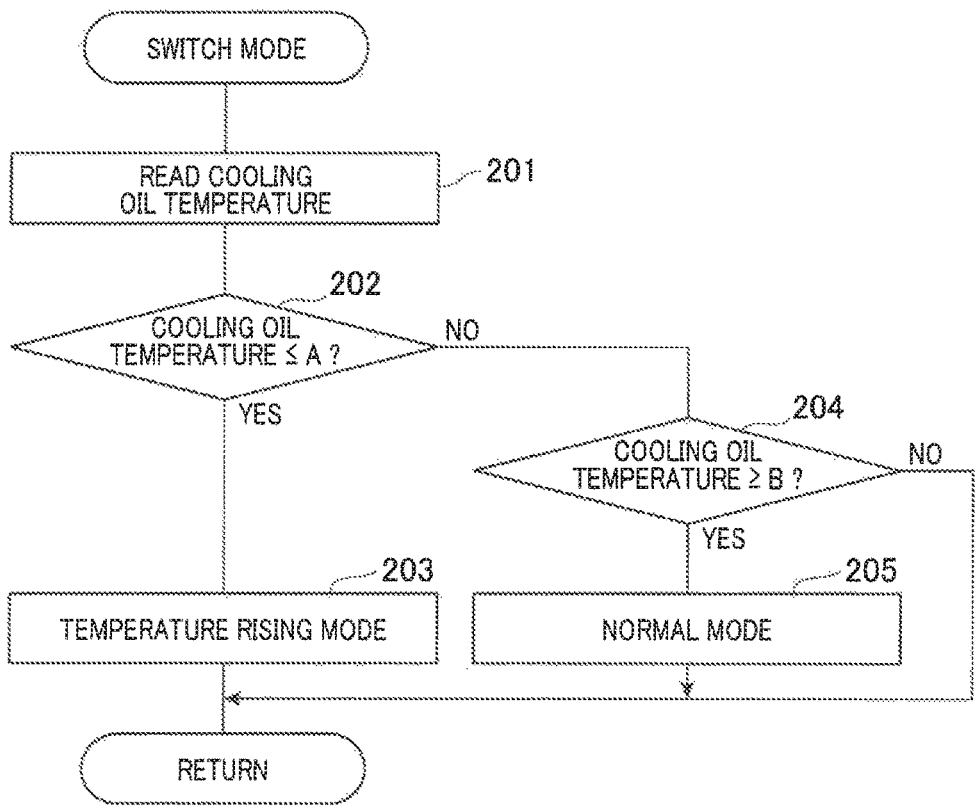
FIG. 9 is a flow chart showing a process flow of a mode switching routine of a second embodiment.

In this second embodiment, the MG-ECU 24 executes a mode switching routine of later-mentioned FIG. 9, whereby the normal mode and the temperature increase mode are switched as follows. When the temperature of the cooling oil 30 detected by the cooling oil temperature sensor 32 is a predetermined value A (that is a first predetermined value) or below, the normal mode is switched to the temperature increase mode, and when the temperature of the cooling oil 30 detected by the cooling oil temperature sensor 32 is a predetermined value B (that is a second predetermined value) or above that is higher than the predetermined value A, the temperature increase mode is switched to the normal mode.

In addition, in this second embodiment, in the temperature increase mode, in accordance with the temperature of the inverter 21 and the current amplitude of the MG 16, a retard temperature increase mode wherein the current phase of the MG 16 is retarded further than in the normal mode and an advance temperature increase mode wherein the current phase of the MG 16 is advanced further than in the normal mode are switched.

Figure 6:
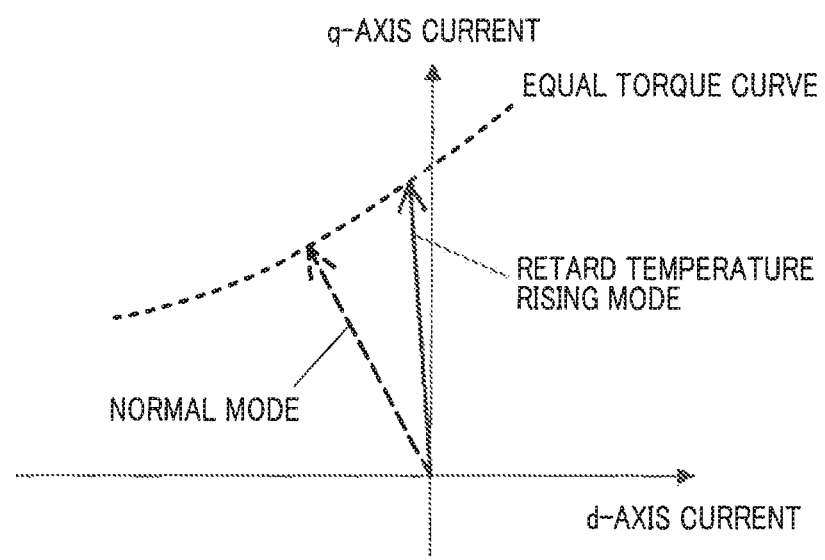
FIG. 6 is a diagram illustrating a retard temperature increase mode.

As illustrated in FIG. 6, in the retard temperature increase mode, a command current vector (d-axis current command value Id, q-axis current command value Iq) is set in such a manner that the current phase of the MG 16 is retarded further than in the normal mode in the equal torque curve for outputting the required torque of the MG 16, and the current F/B control of the MG 16 is performed.

Figure 7:
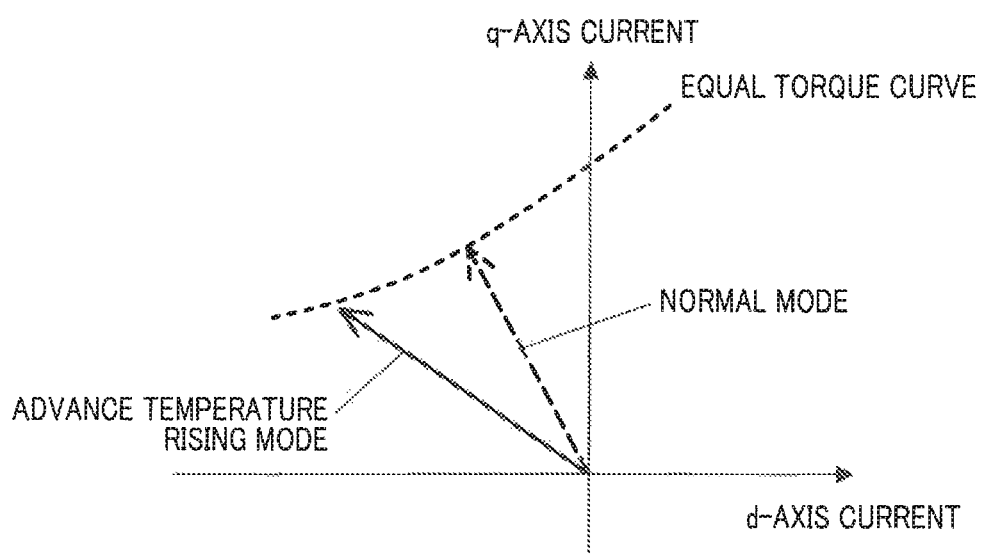
FIG. 7 is a diagram illustrating an advance temperature increase mode.

As illustrated in FIG. 7, in the advance temperature increase mode, a command current vector (d-axis current command value Id, q-axis current command value Iq) is set in such a manner that the current phase of the MG 16 is advanced further than in the normal mode in the equal torque curve for outputting the required torque of the MG 16, and the current F/B control of the MG 16 is performed.

Figure 8:
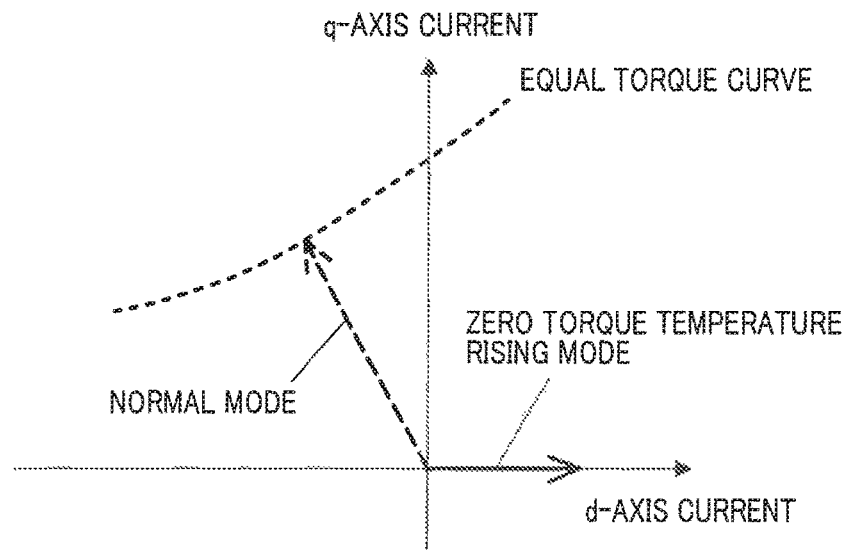
FIG. 8 is a diagram illustrating a zero torque temperature increase mode.

Furthermore, in this second embodiment, in the temperature increase mode, when the required torque of the MG 16 is 0, the mode is switched to a zero torque temperature increase mode wherein the current phase of the MG 16 does not generate a torque. As illustrated in FIG. 8, in the zero torque temperature increase mode, a command current vector (d-axis current command value Id, q-axis current command value Iq) is set in such a manner that the current phase of the MG 16 is a phase with which a torque is not generated (for example, 0 degree or 180 degrees), and the current F/B control of the MG 16 is performed. In this case, the q-axis current command value Iq is set to 0.

Hereinafter, the processing content of a mode switching routine of FIG. 9, which is executed by the MG-ECU 24 in this second embodiment, will be described.

When this routine is activated, first, in step 201, the temperature of the cooling oil 30 detected by the cooling oil temperature sensor 32 is read.

After this, the routine proceeds to step 202, and determines whether or not the temperature of the cooling oil 30 detected by the cooling oil temperature sensor 32 is a predetermined value A or below. Here, the predetermined value A is set to be a temperature at which a drag loss due to the cooling oil 30 exceeds an acceptable level.

In this step 202, when determining that the temperature of the cooling oil 30 is the predetermined value A or below, the routine proceeds to step 203, and switches a normal mode to a temperature increase mode (or maintains the temperature increase mode).

In this temperature increase mode, when the required torque of the MG 16 is other than 0, the retard temperature increase mode and the advance temperature increase mode are switched in accordance with the temperature of the inverter 21 and the current amplitude of the MG 16. In this case, it is determined based on the temperature of the Inverter 21 for example that whether or not the temperature is in a range where temperature increase of the inverter 21 is unnecessary, and at the same time, it is determined based on the current amplitude of the MG 16 that whether or not the temperature is in a range where protection from demagnetization of the permanent magnet is unnecessary. As a result, when it is determined that the temperature is in the range where the temperature increase of the inverter 21 is necessary, or In the range where the protection from demagnetization of the permanent magnet is necessary, the mode is switched to the retard temperature increase mode. Meanwhile, when it is determined that the temperature is in the range where the temperature increase of the Inverter 21 is unnecessary, and in the range where the protection from demagnetization of the permanent magnet is unnecessary, the mode is switched to the advance temperature increase mode.

In the retard temperature increase mode, a command current vector (d-axis current command value Id, q-axis current command value Iq) is set in such a manner that the current phase of the MG 16 is retarded further than in the normal mode in the equal torque curve for outputting the required torque of the MG 16, and the current F/B control of the MG 16 is performed (see FIG. 6).

In the advance temperature increase mode, a command current vector (d-axis current command value Id, q-axis current command value Iq) is set in such a manner that the current phase of the MG 16 is advanced further than in the normal mode in the equal torque curve for outputting the required torque of the MG 16, and the current F/B control of the MG 16 is performed (see FIG. 7).

In addition, in the temperature increase mode, when the required torque of the MG 16 is 0, the mode is switched to the zero torque temperature increase mode. In this zero torque temperature increase mode, a command current vector (d-axis current command value Id, q-axis current command value Iq) Is set in such a manner that the current phase of the MG 16 is a phase with which a torque is not generated (for example, 0 degree or 180 degrees), and the current F/B control of the MG 16 is performed (see FIG. 8).

Meanwhile, in the abovementioned step 202, when determining that the temperature of the cooling oil 30 is higher than the predetermined value A, the routine proceeds to step 204. In this step 204, it is determined that whether or not the temperature of the cooling oil 30 detected by the cooling oil temperature sensor 32 is the predetermined value B or above. Here, the predetermined value B is set to be slightly higher than the predetermined value A.

In this step 204, when determining that the temperature of the cooling oil 30 is the predetermined value B or above, the routine proceeds to step 205, and switches from the temperature increase mode to the normal mode (or maintains the normal mode). In this normal mode, a command current vector (d-axis current command value Id, q-axis current command value Iq) is set in such a manner that the current amplitude and the current phase with which the required torque is most efficiently output in the equal torque curve for outputting the required torque of the MG 16, and the current F/B control of the MG 16 is performed.

In this second embodiment stated above, when the temperature of the cooling oil 30 detected by the cooling oil temperature sensor 32 is a predetermined value A or below, the normal mode is switched to the temperature increase mode, and when the temperature of the cooling oil 30 detected by the cooling oil temperature sensor 32 is a predetermined value B or above, that is higher than the predetermined value A, the temperature increase mode is switched to the normal mode. For this reason, the temperature of the cooling oil 30 is directly detected by the cooling oil temperature sensor 32, necessity of the temperature increase of the cooling oil 30 is securely and accurately determined, and thus the mode can be switched to the temperature increase mode. Furthermore, a hysteresis characteristic can be given to the switching based on the temperature of the cooling oil 30 between the normal mode and the temperature increase mode (that is, a hysteresis is provided in the switching determination values A, B of the normal mode and the temperature increase mode), and frequent mode switching can be prevented.

In addition, in this second embodiment, in the temperature increase mode, in accordance with the temperature of the inverter 21 and the current amplitude of the MG 16, the retard temperature increase mode and the advance temperature increase mode are switched. Thus, when the temperature increase of the inverter 21 and the protection from demagnetization of the permanent magnet are unnecessary, the mode can be switched to the advance temperature increase mode. In this advance temperature increase mode, compared to the retard temperature increase mode, deterioration of power factor is suppressed, and thus an output of the high-tension battery 22 can be reduced, and deterioration of the high-tension battery 22 can be suppressed.

Furthermore, in this second embodiment, in the temperature increase mode, when the required torque of the MG 16 is 0, the mode is switched to the zero torque temperature increase mode. In this way, even when the required torque of the MG 16 is 0, the temperature of the cooling oil 30 can be raised while achieving the required torque (that is, without generating a torque).

Third Embodiment

Figure 11:
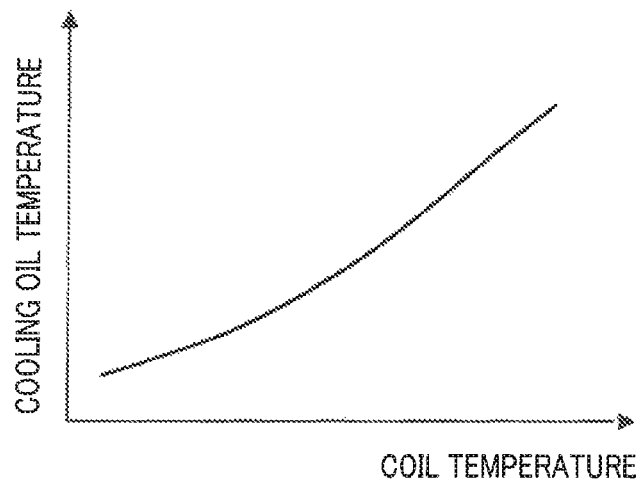
FIG. 11 is a diagram showing a relationship between a coil temperature and a cooling oil temperature.
Figure 12:
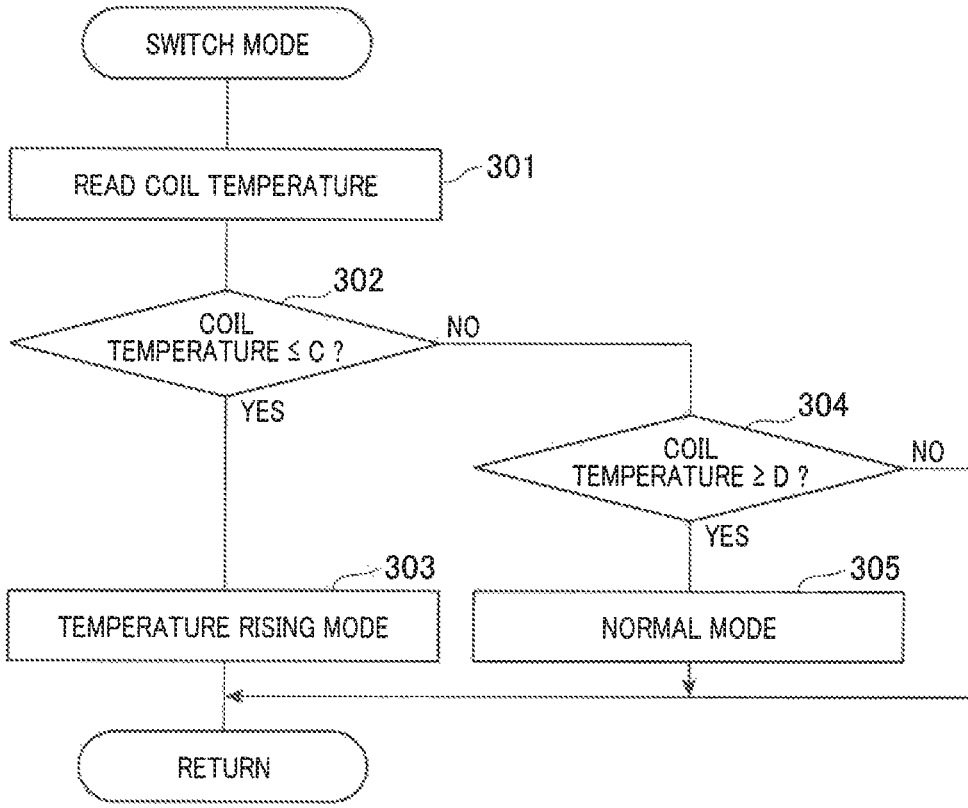
FIG. 12 is a flow chart showing a process flow of a mode switching routine of the third embodiment.

Next, a third embodiment of the present invention will be described with use of FIG. 10 to FIG. 12. However, explanation of a part substantially same as or similar to the aforementioned second embodiment will be omitted or simplified, and a part different from the aforementioned second embodiment will be mainly described.

Figure 10:
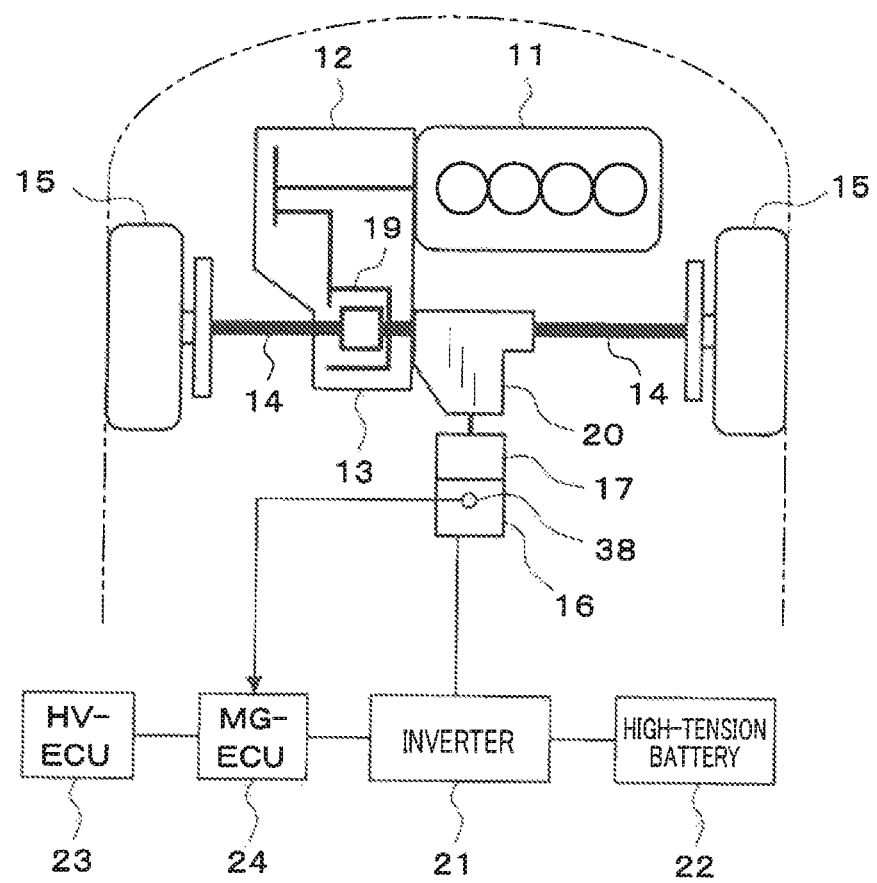
FIG. 10 is a diagram showing a schematic configuration of a control system of a hybrid vehicle of a third embodiment.

In this third embodiment, as illustrated in FIG. 10, a coil temperature sensor 38 for detecting the temperature of the coil 29 is provided in the housing 25 of the MG 16. As illustrated in FIG. 11, there is a correlation between the temperature of the coil 29 and the temperature of the cooling oil 30.

Accordingly, in this third embodiment, the MG-ECU 24 executes a mode switching routine of later-mentioned FIG. 12, whereby the normal mode and the temperature increase mode are switched as follows. When the temperature of the coil 29 detected by the coil temperature sensor 38 is a predetermined value C (that is a third predetermined value) or below, the normal mode is switched to the temperature increase mode, and when the temperature of the coil 29 detected by the coil temperature sensor 38 is a predetermined value D (that is a fourth predetermined value) or above that is higher than the predetermined value C, the temperature increase mode is switched to the normal mode.

Hereinafter, the processing content of a mode switching routine of FIG. 12, which is executed by the MG-ECU 24 in this third embodiment, will be described.

When this routine is activated, first, in step 301, the temperature of the coil 29 detected by the coil temperature sensor 38 is read.

After this, the routine proceeds to step 302, and determines whether or not the temperature of the coil 29 detected by the coil temperature sensor 38 is a predetermined value C or below. Here, the predetermined value C is set to be a temperature at which a drag loss due to the cooling oil 30 exceeds an acceptable level.

In this step 302, when determining that the temperature of the coil 29 is a predetermined value C or below, the routine proceeds to step 303, and switches from the normal mode to the temperature increase mode (or maintains the temperature increase mode). In this temperature increase mode, when the required torque of the MG 16 is other than 0, the retard temperature increase mode and the advance temperature increase mode are switched in accordance with the temperature of the inverter 21 and the current amplitude of the MG 16. In addition, in the temperature increase mode, when the required torque of the MG 16 is 0, the mode is switched to the zero torque temperature increase mode.

Meanwhile, in the abovementioned step 302, when determining that the temperature of the cooling oil 29 is higher than the predetermined value C, the routine proceeds to step 304. In this step 304, it is determined that whether or not the temperature of the coil 29 detected by the coil temperature sensor 38 is the predetermined value D or above. Here, the predetermined value D is set to be slightly higher than the predetermined value C.

In this step 304, when determining that the temperature of the coil 29 is the predetermined value D or above, the routine proceeds to step 305, and switches from the temperature increase mode to the normal mode (or maintains the normal mode).

In this third embodiment stated above, when the temperature of the coil 29 detected by the coil temperature sensor 38 is the predetermined value C or below, the normal mode is switched to the temperature increase mode, and when the temperature of the coil 29 detected by the coil temperature sensor 38 is the predetermined value D or above that is higher than the predetermined value C, the temperature increase mode is switched to the normal mode. For this reason, even in a case where the cooling oil temperature sensor is not installed, necessity of the temperature increase of the cooling oil 30 is accurately determined based on the temperature of the coil 29 detected by the coil temperature sensor 38, and thus the mode can be switched to the temperature increase mode. Furthermore, a hysteresis characteristic can be given to the switching based on the temperature of the coil 29 between the normal mode and the temperature increase mode (that is, a hysteresis is provided in the switching determination values C, D of the normal mode and the temperature increase mode), and frequent mode switching can be prevented.

Fourth Embodiment

Figure 13:
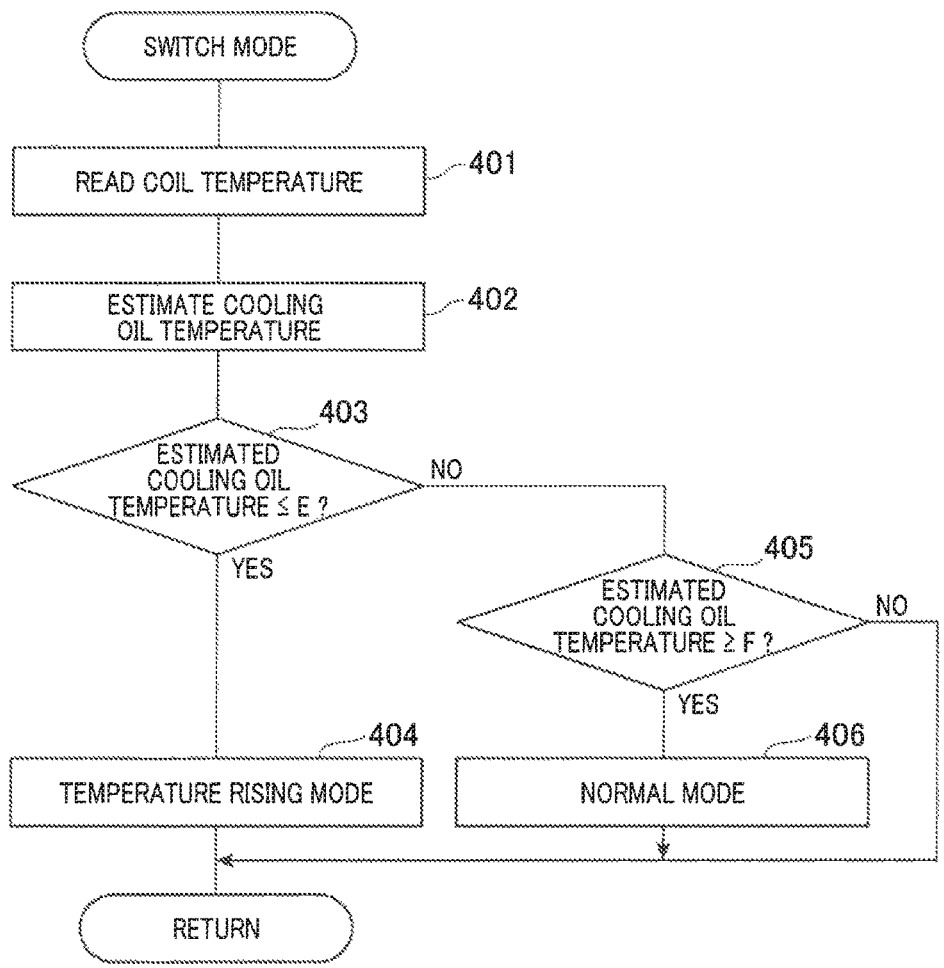
FIG. 13 is a flow chart showing a process flow of a mode switching routine of a fourth embodiment.

Next, a fourth embodiment of the present invention will be described with use of FIG. 13. However, explanation of a part substantially same as or similar to the aforementioned third embodiment will be omitted or simplified, and a part different from the aforementioned third embodiment will be mainly described.

In this fourth embodiment, again, the coil temperature sensor 38 for detecting the temperature of the coil 29 is provided. As mentioned above, there is a correlation between the temperature of the coil 29 and the temperature of the cooling oil 30, and therefore, the temperature of the cooling oil 30 can be estimated from the temperature of the coil 29.

Accordingly, in this fourth embodiment, the MG-ECU 24 executes a mode switching routine of later-mentioned FIG.

13, whereby the normal mode and the temperature increase mode are switched as follows. The temperature of the cooling oil 30 is estimated based on the temperature of the coil 29 detected by the coil temperature sensor 38. When the estimated cooling oil temperature that is the estimated value is a predetermined value E (that is a fifth predetermined value) or below, the normal mode is switched to the temperature increase mode, and when the estimated cooling oil temperature is a predetermined value F (that is a sixth predetermined value) or above that is higher than the predetermined value E, the temperature increase mode is switched to the normal mode.

Hereinafter, the processing content of a mode switching routine of FIG. 13, which is executed by the MG-ECU 24 in this fourth embodiment, will be described.

When this routine is activated, first, in step 401, the temperature of the coil 29 detected by the coil temperature sensor 38 is read.

After this, the routine proceeds to step 402, the temperature of the cooling oil 30 is estimated by a map, a mathematical formula or the like based on the temperature of the coil 29 detected by the coil temperature sensor 38, and the estimated value is set as an estimated cooling oil temperature. Here, the map, mathematical formula or the like for estimating the temperature of the cooling oil based on the temperature of the coil 29 is preliminarily created 30 based on test data, design data or the like, and is stored in an ROM or the like of the MG-ECU 24 (or HV-ECU 23).

After this, the routine proceeds to step 403, and determines whether or not the estimated cooling oil temperature is a predetermined value E or below. Here, the predetermined value E is set to be a temperature at which a drag loss due to the cooling oil 30 exceeds an acceptable level.

In this step 403, when determining that the estimated cooling oil temperature is the predetermined value E or below, the routine proceeds to step 404, and switches the normal mode to the temperature increase mode (or maintains the temperature increase mode). In this temperature increase mode, when the required torque of the MG 16 is other than 0, the retard temperature increase mode and the advance temperature increase mode are switched in accordance with the temperature of the inverter 21 and the current amplitude of the MG 16. In addition, in the temperature increase mode, when the required torque of the MG 16 is 0, the mode is switched to the zero torque temperature increase mode.

Meanwhile, in the abovementioned step 403, when determining that the estimated cooling oil temperature is higher than the predetermined value E, the routine proceeds to step 405. In this step 405, it is determined that whether or not the estimated cooling oil temperature is the predetermined value F or above. Here, the predetermined value F is set to be slightly higher than the predetermined value E.

In this step 405, when determining that the estimated cooling oil temperature is the predetermined value F or above, the routine proceeds to step 406, and switches from the temperature increase mode to the normal mode (or maintains the normal mode).

In this fourth embodiment sated above, the temperature of the cooling oil 30 is estimated based on the temperature of the coil 29 detected by the coil temperature sensor 38, and when the estimated cooling oil temperature thereof is the predetermined value E or below, the normal mode is switched to the temperature increase mode, and when the estimated cooling oil temperature is the predetermined value F or above that is higher than the predetermined value E, the temperature increase mode is switched to the normal mode. For this reason, even in a case where the cooling oil temperature sensor is not installed, necessity of the temperature increase of the cooling oil 30 is accurately determined based on the estimated cooling oil temperature estimated from the temperature of the coil 29, and thus the mode can be switched to the temperature increase mode. Furthermore, a hysteresis characteristic can be given to the switching based on the estimated cooling oil temperature between the normal mode and the temperature increase mode (that is, a hysteresis is provided in the switching determination values E, F of the normal mode and the temperature increase mode), and frequent mode switching can be prevented.

Fifth Embodiment

Next, a fifth embodiment of the present invention will be described with use of FIG. 14 to FIG. 16. However, explanation of a part substantially same as or similar to the aforementioned second embodiment will be omitted or simplified, and a part different from the aforementioned second embodiment will be mainly described.

Figure 14:
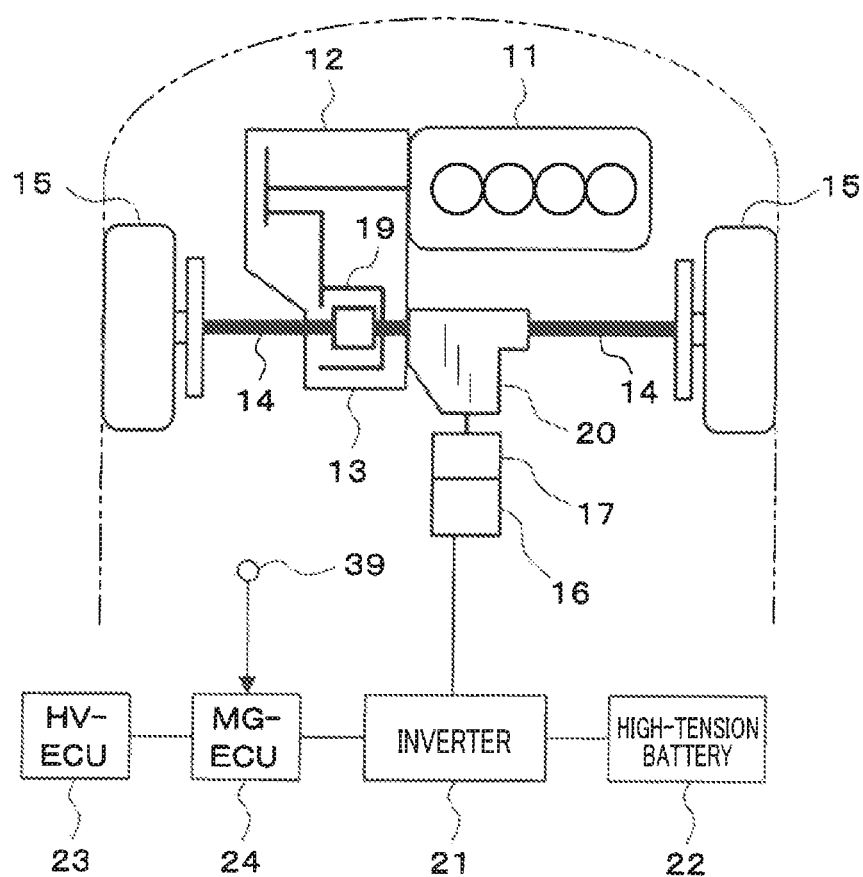
FIG. 14 is a diagram showing a schematic configuration of a control system of a hybrid vehicle of a fifth embodiment.

In this fifth embodiment, as illustrated in FIG. 14, an outside air temperature sensor 39 for detecting an outside air temperature is provided. As illustrated in FIG. 15, there is a correlation between the outside air temperature, a MG non-driven time (that is, an elapsed time from a time at which the MG 16 becomes in a non-driven state) and the temperature of the cooling oil 30, and therefore, the temperature of the cooling oil 30 can be estimated from the outside air temperature and the MG non-driven time.

Accordingly, in this fifth embodiment, the MG-ECU 24 executes a mode switching routine of later-mentioned FIG. 16, whereby the normal mode and the temperature increase mode are switched as follows. The temperature of the cooling oil 30 is estimated based on the outside air temperature detected by the outside air temperature sensor 39 and the MG non-driven time, and when an estimated cooling oil temperature that is the estimated value is a predetermined value G (that is a seventh predetermined value) or below, the normal mode is switched to a temperature increase mode.

Hereinafter, the processing content of a mode switching routine of FIG. 16, which is executed by the MG-ECU 24 in this fifth embodiment, will be described.

When this routine is activated, first, in step 501, the outside air temperature detected by the outside air temperature sensor 39 is read.

After this, the routine proceeds to step 502, and the temperature of the cooling oil 30 is estimated as follows.

While the MG 16 is not driven (that is, during driving stop), the temperature of the cooling oil 30 is estimated by a map, a mathematical formula or the like based on the outside air temperature detected by the outside air temperature sensor 39 and the MG non-driven time, and the estimated value is set as the estimated cooling oil temperature. Here, the map, mathematical formula or the like for estimating the temperature of the cooling oil 30 based on the outside air temperature and the MG non-driven time is preliminarily created based on test data, design data or the like, and is stored in an ROM or the like of the MG-ECU 24 (or HV-ECU 23).

Meanwhile, while the MG 16 is driven, the temperature of the cooling oil 30 is estimated by a map, a mathematical formula or the like based on a MG driving time (that is, an elapsed time from the start of driving of the MG 16) and a driving current of the MG 16, and the estimated value is set as the estimated cooling oil temperature. Here, the map, mathematical formula or the like for estimating the temperature of the cooling oil 30 based on the MG driving time and the driving current of the MG 16 is preliminarily created based on test data, design data or the like, and is stored in an ROM or the like of the MG-ECU 24 (or HV-ECU 23).

After this, the routine proceeds to step 503, and determines whether or not the estimated cooling oil temperature is the predetermined value G or below. Here, the predetermined value G is set to be a temperature at which a drag loss due to the cooling oil 30 exceeds an acceptable level.

In this step 503, when determining that the estimated cooling oil temperature is the predetermined value E or below, the routine proceeds to step 504, and switches the normal mode to the temperature increase mode (or maintains the temperature increase mode). In this temperature increase mode, when the required torque of the MG 16 is other than 0, the retard temperature increase mode and the advance temperature increase mode are switched in accordance with the temperature of the inverter 21 and the current amplitude of the MG 16. In addition, in the temperature increase mode, when the required torque of the MG 16 is 0, the mode is switched to the zero torque temperature increase mode.

Meanwhile, in the abovementioned step 503, when determining that the estimated cooling oil temperature is higher than the predetermined value G, the routine proceeds to step 505. In this step 505, it is determined that whether or not the estimated cooling oil temperature is a predetermined value H (that is a eighth predetermined value) or above. Here, the predetermined value H is set to be slightly higher than the predetermined value G.

In this step 505, when determining that the estimated cooling oil temperature is the predetermined value H or above, the routine proceeds to step 506, and switches from the temperature increase mode to the normal mode (or maintains the normal mode).

In this fifth embodiment stated above, the temperature of the cooling oil 30 is estimated based on the outside air temperature detected by the outside air temperature sensor 39 and the MG non-driven time, when the estimated cooling oil temperature is the predetermined value G or below, the normal mode is switched to the temperature increase mode. For this reason, even in a case where the cooling oil temperature sensor is not installed, the necessity of increasing the temperature of the cooling oil 30 is accurately determined based on the estimated cooling oil temperature estimated from the outside air temperature and the MG non-driven time, and thus the mode can be switched to the temperature increase mode.

In addition, in each of the abovementioned second to fifth embodiments, in the temperature increase mode, the retard temperature increase mode and the advance temperature increase mode are switched in accordance with both of the temperature of the inverter 21 and the current amplitude of the MG 16. However, the switching is not limited to this, and in the temperature increase mode, the retard temperature increase mode and the advance temperature increase mode may be switched in accordance with one of the temperature of the inverter 21 and the current amplitude of the MG 16. Alternatively, in the temperature increase mode, the retard temperature increase mode or the advance temperature increase mode may be applied at all times.

Sixth Embodiment

Next, a sixth embodiment of the present invention will be described with use of FIG. 17. However, explanation of a part substantially same as or similar to the aforementioned first embodiment will be omitted or simplified, and a part different from the aforementioned first embodiment will be mainly described.

Figure 17:
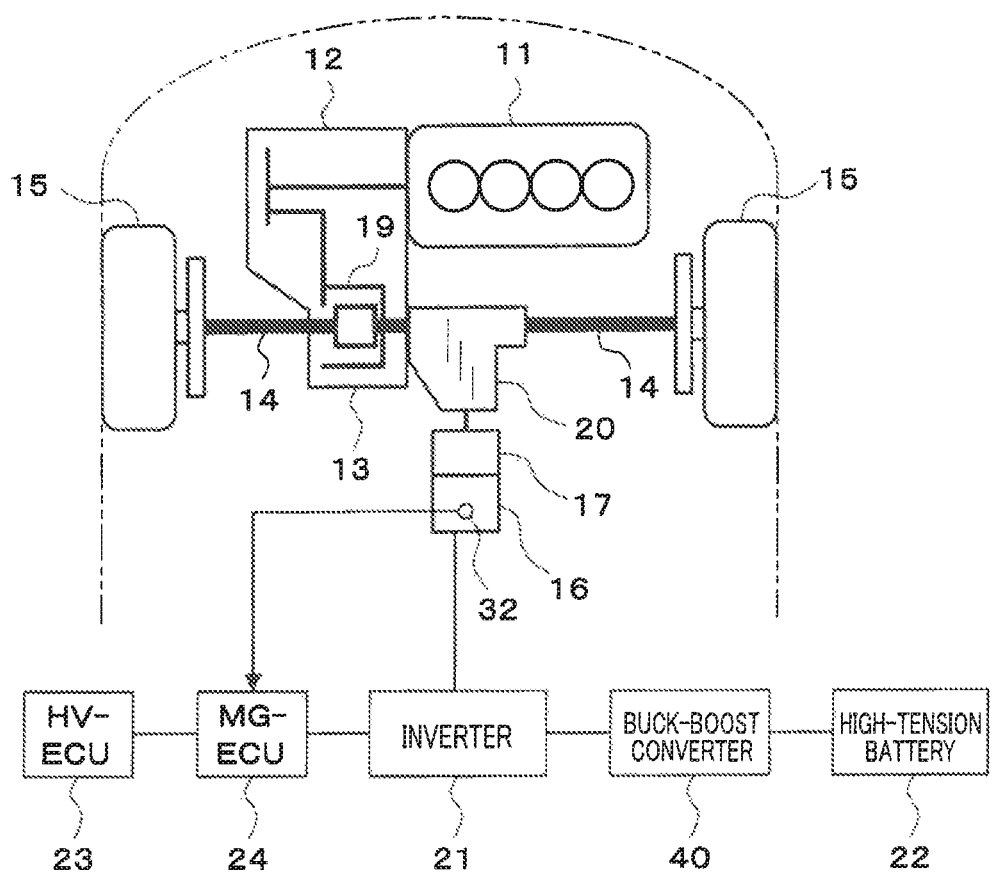
FIG. 17 is a diagram showing a schematic configuration of a control system of a hybrid vehicle of a sixth embodiment.

In this sixth embodiment, as illustrated in FIG. 17, a buck-boost converter 40 is connected between the high-tension battery 22 and the inverter 21, and electric power is transferred between the MG 16 and the high-tension battery 22 via the buck-boost converter 40 and the inverter 21. The buck-boost converter 40 boosts a direct-current voltage of the high-tension battery 22 to make an input voltage of the inverter 21 higher than the direct-current voltage of the high-tension battery 22. The inverter 21 converts the direct-current voltage boosted by the buck-boost converter 40 to an alternating-current voltage to drive the MG 16.

In addition, in this sixth embodiment, the MG-ECU 24 controls the switching between the normal mode and the temperature increase mode by the output voltage of the buck-boost converter 40. In particular, the output voltage of the buck-boost converter 40 is varied in a range between a high side voltage (for example, 400 V) and a low side voltage (for example 200 V) that is lower than this high side voltage. When the output voltage of the buck-boost converter 40 is the low side voltage, a weak field region wherein field-weakening control of the MG 16 is performed is considerably enlarged more than that of a case of being the high side voltage. Here, the field-weakening control reduces a magnetic-flux in the d-axial direction with use of a demagnetization effect by an armature reaction by supplying, for example, a negative d-axis current (that is, excitation current).

Furthermore, when the normal mode is switched to the temperature increase mode, the output voltage of the buck-boost converter 40 is configured so as to be the low side voltage to perform the field-weakening control, thereby changing the current phase of the MG 16 to be advanced further than in the normal mode. Meanwhile, when the temperature increase mode is switched to the normal mode, the output voltage of the buck-boost converter 40 is switched to the high side voltage to perform a field-strengthening control, thereby bringing the current phase of the MG 16 back to a phase of the normal mode. For this reason, mode switching (that is, the switching between the normal mode and the temperature increase mode) can be performed by switching the output voltage of the buck-boost converter 40. The mode switching by this buck-boost converter 40 may be performed in the aforementioned first to fifth embodiments.

Seventh Embodiment

Next, a seventh embodiment of the present invention will be described with use of FIG. 18. However, explanation of a part substantially same as or similar to the aforementioned first embodiment will be omitted or simplified, and a part different from the aforementioned first embodiment will be mainly described.

In this seventh embodiment, as illustrated in FIG. 18, the output signal of the cooling oil temperature sensor 32 is input to the HV-ECU 23. Alternatively, the output signal of coil temperature sensor 38 or the output signal of the outside air temperature sensor 39 is input to the HV-ECU 23. Furthermore, the mode switching described in the aforementioned embodiments 1-6 is performed by this HV-ECU 23. Even in this way, an effect same as that of the aforementioned embodiments can be obtained.

In addition, in each of the abovementioned embodiments, part or whole of the functions executed by the MG-ECU 24 and the HV-ECU 23 may be configured with one or more of ICs or the like in the manner of hardware.

In addition, in each of the abovementioned embodiments, the cooling oil 30 is stored up to the height position that is lower than the rotating shaft 26 of the rotor 27. However, the height is not limited to this, and the cooling oil 30 may be stored up to a height position that is higher than the rotating shaft 26 of the rotor 27. In addition, the cooling oil 30 may be configured so as to circulate to the outside of the MG 16.

In addition, in each of the abovementioned Embodiments, the cooling oil 30 is sealed in the housing 25, and configured so as not to circulate through the inside and outside of the housing. However, an opening may be provided in the housing, and an oil piping connecting to an oil cooler or an oil pump may be connected to this opening. In this case, the cooling oil 30 is configured so as to move in and out of the inside and outside of the housing.

Other than that, the present invention is not limited to a hybrid vehicle having the configuration shown in FIG. 1 or the like, and may be applied to a motor of a hybrid vehicle having various types of configurations, in which an engine and a motor are mounted as a power source of the vehicle. In addition, the present invention is not limited to a hybrid vehicle, and may be applied to a motor of an electric vehicle in which only a motor is mounted as a power source of the vehicle. Furthermore, the present invention may be applied to a motor other than a power source of a vehicle.

In addition, in each of the above embodiments, the equal torque curve may have a width within a range not causing a problem on practical use.

What is claimed is:

1. An apparatus for controlling a motor having a housing in which a stator and a rotor are disposed, the motor being cooled by a cooling oil in the housing, the apparatus comprising:
   an inverter configured to drive the motor;
   a battery configured to supply electric power to the motor; and
   a control unit configured to:
      control the motor in accordance with a temperature increase mode, the temperature increase mode: (i) heating the cooling oil using heat generated by a resistance of a coil provided in the stator of the motor, and (ii) controlling the motor with a current amplitude and a current phase that are different from a normal current amplitude and a normal current phase of a normal mode in which the motor is controlled with the normal current amplitude and the normal current phase with which a required torque of the motor is efficiently output,
      in the temperature increase mode, configure the current phase of the motor to be retarded further than in the normal mode; and
      in the temperature increase mode, switch between a retard temperature increase mode in which the current phase of the motor is configured to be retarded further than in the normal mode and an advance temperature increase mode in which the current phase of the motor is configured to be advanced further than in the normal mode in accordance with at least one of a temperature of the inverter and the current amplitude of the motor.

2. The apparatus according to claim 1, wherein the control unit configures the current phase of the motor to be a phase with which a torque is not generated when the required torque of the motor is zero in the temperature increase mode.

3. The apparatus according to claim 1, further comprising:
   a cooling oil temperature sensor configured to detect the temperature of the cooling oil,
      wherein the control unit switches from the normal mode to the temperature increase mode when the temperature of the cooling oil detected by the cooling oil temperature sensor is equal to or less than a first predetermined temperature value.

4. The apparatus according to claim 3, wherein the control unit switches from the temperature increase mode to the normal mode when the temperature of the cooling oil detected by the cooling oil temperature sensor is equal to or greater than a second predetermined temperature value, which is higher than the first predetermined temperature value.

5. The apparatus according to claim 1, further comprising:
   a coil temperature sensor configured to detect the temperature of the coil,
      wherein the control unit is configured to switch from the normal mode to the temperature increase mode when the temperature of the coil detected by the coil temperature sensor is equal to or less than a third predetermined temperature value.

6. The apparatus according to claim 5, wherein the control unit is configured to switch from the temperature increase mode to the normal mode when the temperature of the coil detected by the coil temperature sensor is equal to or greater than a fourth predetermined temperature value, which is higher than the third predetermined temperature value.

7. The apparatus according to claim 1, further comprising:
   a coil temperature sensor configured to detect the temperature of the coil,
      wherein the control unit is configured to estimate the temperature of the cooling oil based on the temperature of the coil detected by the coil temperature sensor, and switch from the normal mode to the temperature increase mode when the estimated cooling oil temperature value is equal to or less than a fifth predetermined temperature value.

8. The apparatus according to claim 7, wherein the control unit is configured to switch from the temperature increase mode to the normal mode when the estimated cooling oil temperature is equal to or greater than a sixth predetermined temperature value, which is higher than the fifth predetermined temperature value.

9. The apparatus according to claim 8, further comprising:
   an outside air temperature sensor configured to detect an outside air temperature,
      wherein the control unit is configured to estimate the temperature of the cooling oil based on the outside air temperature detected by the outside air temperature sensor and an elapsed time from a time at which the motor becomes in a non-driven state, and switch from the normal mode to the temperature increase mode when the estimated cooling oil temperature is equal to or less than a seventh predetermined temperature value.

10. The apparatus according to claim 1, further comprising:
   a buck-boost converter connected between the battery and the inverter,
      wherein the control unit is configured to control switching between the normal mode and the temperature increase mode based on an output voltage of the buck-boost converter.

11. The apparatus according to claim 1, wherein the cooling oil is sealed in an enclosed space in the housing, and the cooling oil is stored up to a height position that is higher than a lowest part of the rotor and lower than a rotating shaft of the rotor.

12. The apparatus according to claim 1, wherein the motor is mounted as a power source of a vehicle.

\* \* \* \* \*